United States Patent

Nakagami et al.

[15] 3,652,806

[45] Mar. 28, 1972

[54] TRANSPORTABLE TELEPHONE EXCHANGE APPARATUS

[72] Inventors: Norihiko Nakagami, Matsuyama-shi; Yasuyuki Tanaka; Katsuhiro Kotaka; Masamitsu Seki, all of Yokohama, Japan

[73] Assignees: Hitachi, Ltd.; Nippon Telegraph and Telephone Public Corporation, Tokyo, Japan

[22] Filed: July 11, 1968

[21] Appl. No.: 744,003

[30] Foreign Application Priority Data

July 14, 1967 Japan....................................42/45037

[52] U.S. Cl.............................................................179/99

[51] Int. Cl..........................................................H04m 1/00

[58] Field of Search.................179/91; 248/119, 24, 23, 401; 298/9, 15, 24, 22

[56] References Cited

UNITED STATES PATENTS

| | | | |
|---|---|---|---|
| 2,399,414 | 4/1946 | Wells et al. | 248/22 |
| 3,180,594 | 4/1965 | Connell | 248/9 |
| 2,739,774 | 3/1956 | Crede | 248/24 |
| 2,999,904 | 9/1961 | Lohs et al. | 179/91 |

FOREIGN PATENTS OR APPLICATIONS

| | | | |
|---|---|---|---|
| 1,162,417 | 2/1964 | Germany | 179/98 |

OTHER PUBLICATIONS

IEEE Transactions on Communications and Electronics, Vol. 83, No. 75, Nov. 1964, p. 664

*Primary Examiner*—Kathleen H. Claffy
*Assistant Examiner*—Thomas L. Kundert
*Attorney*—Craig, Antonelli and Hill

[57] ABSTRACT

A transportable telephone exchange apparatus that can be moved to a district to deal with a temporary shortage of subscriber lines in that district. In the apparatus, a row of stationary bays and a row of movable bays are arranged in a back-to-back relationship with each other to form a bay block, and there are at least two bay blocks in which the movable bays in the different rows face each other while the stationary bays face the side walls of the casing of the apparatus so as to define at least two maintenance passages of sufficient width within the apparatus.

1 Claim, 6 Drawing Figures

INVENTORS
NORIHIKO NAKAGAMI, YASUYUKI TANAKA,
KATSUHIRO KOTAKA, MASAMITSU SEKI

BY Craig e Antonelli
ATTORNEYS

INVENTORS

NORIHIKO NAKAGAMI, YASUYUKI TANAKA, KATSUHIRO KOTAKA, MASAMITSU SEKI

BY Craig & Antonelli

ATTORNEYS

INVENTORS
NORIHIKO NAKAGAMI, YASUYUKI TANAKA
KATSUHIRO KOTAKA, MASAMITSU SEKI

BY Craig & Antonelli
ATTORNEYS

TRANSPORTABLE TELEPHONE EXCHANGE APPARATUS

This invention relates to transportable telephone exchange apparatus and more particularly to the structure of a mobile telephone exchange apparatus of the kind which comprises a number of bays accommodated within a single container casing and which can be transported by a tractor or like transporting means to any desired place to be stationed thereat.

An auxiliary telephone exchange apparatus of relatively small capacity is generally affixed to an existing exchange office when the number of persons who wish to become telephone subscribers exceeds the serviceable capacity of that office so as to remedy the inconvenience of these prospective telephone subscribers until a switching apparatus of a larger capacity is additionally installed in the office. Such a telephone exchange apparatus is also needed in a district in which there is no existing exchange office in spite of a rapid increase in population so that the exchange apparatus can be used as a temporary expedient until a new and permanent telephone exchange office with a large capacity of subscribers is built, or in a district where the switching function of an existing exchange office has ceased due to a disaster such as a flood or earthquake so that the exchange apparatus can serve as a temporary exchange office until the damaged exchange office is completely restored.

Such a transportable telephone exchange apparatus must be small in size so that it can easily be transported to any desired place to deal with the situation because it is a temporary expedient until an expansion in the capacity of the existing exchange office is accomplished, or the new telephone exchange office is completed, or the existing exchange office which encountered the disaster is completely restored. In addition to the above requirement, the exchange apparatus must have a line capacity sufficient to accommodate as many telephone subscribers as possible.

It is therefore a primary object of the present invention to provide a transportable telephone exchange apparatus small in size and with a large line capacity which comprises a number of bays contained within a container casing having a limited small interior volume.

Another object of the present invention is to provide a transportable telephone exchange apparatus having a number of bays arranged in a highly dense relationship within a small container casing, in which a plurality of maintenance passages of sufficient width are provided so as to permit unobstructed maintenance work on faulty bays by a maintenance engineer.

A further object of the present invention is to provide a transportable telephone exchange apparatus of the above character in which suitable means forming part of the apparatus, instead of special supporting members, are utilized to support a cable network which is laid in the apparatus for electrically connecting the bays contained within the container casing with each other and supplying electric power to these bays, thereby reducing the height of the container casing and hence the weight of the apparatus as a whole.

A still further object of the present invention is to provide a transportable telephone exchange apparatus of the above character in which a main composite cable for electrically connecting the bays with each other and for supplying electric power to these bays and subsidiary composite cables branched from the main composite cable are arranged to run through a useless or dead space inevitably formed within the container casing so as to fully and effectively utilize the space within the casing.

Another object of the present invention is to provide a transportable telephone exchange apparatus of the above character which is equipped with vibration absorbing means so that those bays among the many bays accommodated within the container casing which can not be firmly secured to the casing in view of the support structure therefor can be protected against external vibrations that may be imparted thereto during the transportation of the apparatus from place to place.

In order to attain the objects described above, the present invention contemplates the provision of a transportable telephone exchange apparatus which comprises a generally box-like container casing, a number of bays contained within said container casing, said bays including those which are stationarily supported within said container casing (hereinafter to be referred to as stationary bays) and those which are swingably supported within said container casing by hinge means (hereinafter to be referred to as movable bays), said bays being arranged to form at least two bay blocks each including a row of a plurality of said stationary bays and a row of a plurality of said movable bays, said row of said stationary bays in each block being disposed in a back-to-back relationship with respect to said row of said movable bays in the same block while said rows of said movable bays in the different blocks being disposed in a face-to-face relationship with each other, a first passage for maintenance provided between the opposite side walls of said container casing and said bay blocks within said container casing for the maintenance and inspection of the front side of said bays included in said rows of said stationary bays, and a second passage for maintenance provided between said bay blocks and having a sufficient width to allow for a swinging movement through about 90° of said bays included in said rows of said movable bays so as to provide for the maintenance and inspection of the front side of said movable bays in their normal non-moved or closed position and of the rear side of said movable bays as well as the rear side of said stationary bays when said movable bays are urged to swing to their open position.

In the telephone exchange apparatus according to the present invention, the bays contained in the container casing are fixedly or movably connected at their upper part with beams spanning between the side walls of the container casing and are thus prevented from turning over. These beams have the additional function of serving as a support for a main composite cable running through a dead space formed between the beams and the ceiling of the container casing. Subsidiary composite cables which are terminal portions branched off from the main composite cable are led into the space defined between the movable bays and the stationary bays in each bay block or into the space defined between the adjacent movable bays or between the adjacent stationary bays in each bay block so as to be connected with the necessary electrical equipment and appliances mounted in the bays.

Furthermore, a vibration absorbing means is provided on the floor of the casing at a position directly beneath each movable bay when the latter is situated in its closed position. The vibration absorbing means has the function of slightly raising the movable bay and cooperates with a resilient member mounted thereon or on the bottom of the movable bay and with a fixing means such as a bolt fixing the vibration absorbing means to the bottom of the movable bay in order to protect the movable bay, which can not be firmly secured to the container casing in view of its structural design, from vibrations that may be imparted to the movable bay during transportation of the apparatus from place to place.

Other objects, features and advantages of the present invention will be more apparent from the following detailed description of a preferred embodiment thereof when taken in conjunction with the accompanying drawings, in which.

Figure 1:
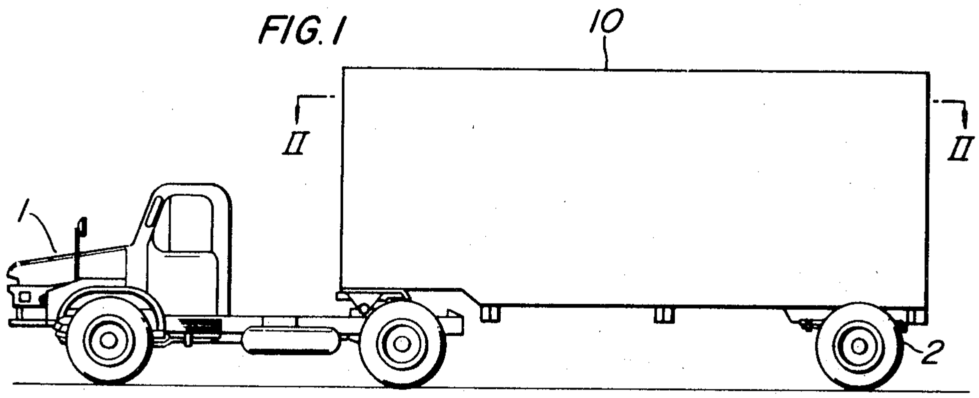
FIG. 1 is a side elevational view showing one form of transportation of the transportable telephone exchange apparatus embodying the present invention.

Referring to FIG. 1, the transportable telephone exchange apparatus according to the present invention is generally designated by the reference numeral 10 and is shown as being transported on a road to a desired location of installation. In the illustrated example, the transportable telephone exchange apparatus 10 is connected at its front part with a tractor 1 and is provided at its rear part with a dolly 2. After transportation to the desired location of installation, the transportable telephone exchange apparatus 10 is slightly lifted by a suitable lifting means and the tractor 1 and the dolly 2 are disconnected from the apparatus 10. Then, the upward pressure applied by the lifting means is released to lower and place the apparatus 10 on a pre-formed concrete foundation.

Figure 2:
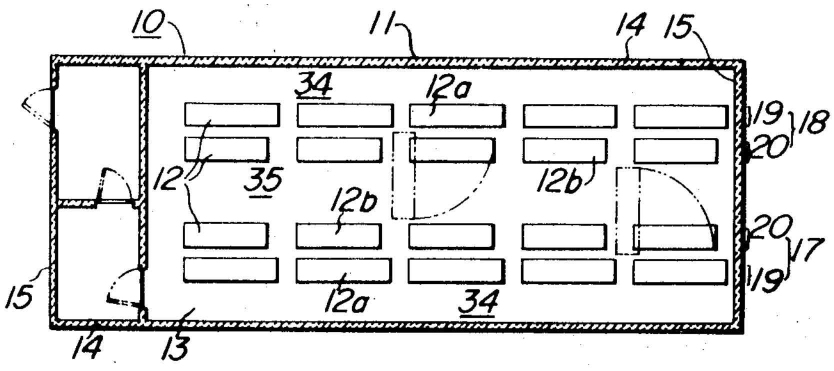
FIG. 2 is a cross-sectional view taken substantially along the line II—II in FIG. 1, in which all the electrical parts, appliances and structural members except the bays are removed to illustrate the arrangement of the bays contained within a container casing.

Referring to FIG. 2, the transportable telephone exchange apparatus 10 comprises a container casing 11 containing therein a number of bays 12. In FIG. 2, all of the interior equipment including cables and other electrical appliances are removed in order to clearly illustrate the arrangement of the bays 12 contained within the casing 11. The container casing 11 is of dustproof and waterproof structure and may be thermally insulated from the external atmosphere by a heat insulator at its floor 13, four side walls 14, 15 and ceiling 16 (FIGS. 4 and 5) so that it can be insulated from external heat depending on the place of installation. Although not shown in FIG. 2, electrical equipment and appliances including storage batteries servicing as an auxiliary power supply, rectifiers and a dehydrator are installed in the casing 11.

It will be seen in FIG. 2 that two bay blocks 17 and 18 each consisting of a plurality of bays 12 are arranged parallelly along the side walls 14 of the casing 11. Of these bays 12 included in the bay blocks 17 and 18, those designated by the reference numeral **12*a* are stationary bays which are stationarily mounted on the floor 13 of the casing 11, while those designated by the reference numeral 12*b* are movable bays which are swingably mounted on the floor 13 of the casing 11. It will therefore be apparent that each of the bay blocks 17 and 18 comprises a row 19 of stationary bays 12*a* and a row 20 of movable bays 12*b*. The stationary bays 12*a* and the movable bays 12*b* in each of the bay blocks 17 and 18 constitute the respective rows 19 and 20 which are arranged in a back-to-back relationship with each other, and therefore all the stationary bays 12*a* have their front side directed toward the corresponding side walls 14, while the movable bays 12*b* in the respective bay blocks 17 and 18** have their front side directed toward each other.

Figure 4:
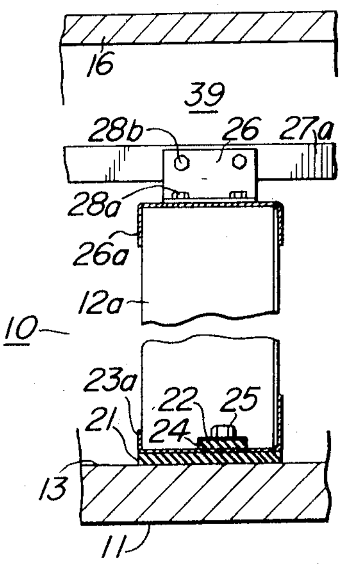
FIG. 4 is an enlarged vertical sectional view to show a mounting structure for a bay, especially a stationary bay contained within the casing.

In FIG. 4 there is shown a practical mounting structure for mounting each of the stationary bays **12*a* within the casing 11. The stationary bay 12*a* is supported on a plurality of resilient pads 21 cemented or otherwise secured to the floor 13. A resilient sheet 24 is interposed between a washer 22 and a bottom plate 23*a* of the stationary bay 12*a*, and a bolt 25 is passed through the washer 22, the resilient sheet 24, the bottom plate 23*a* and the resilient pad 21 in the above order to be screwed into a threaded bore in the floor 13 thereby to secure the lower part of the stationary bay 12*a* to the floor 13, hence to the casing 11. The upper part of the stationary bay 12*a* is also firmly secured to the casing 11 by means as described below. More precisely, an upper plate 26*a* covering the stationary bay 12*a* is fixed at opposite ends to L-shaped members 26 by bolts 28*a* and the L-shaped members 26 are in turn fixed by bolts 28*b* to parallel beams 27*a* or 27*b* of C-like sectional shape which span between the side walls 14 of the casing 11 and are spaced a predetermined distance from each other. Thus, the stationary bays 12*a* are prevented from turning over by being securely fixed at their upper and lower parts to the casing 11, and the resilient pads 21 and the resilient sheets 24 absorb the vibrations occurring during the transportation of the mobile telephone exchange apparatus 10 thereby protecting the electronic equipment and appliances such as electromagnetic relays, resistors and capacitors mounted in the stationary bays 12*a*** from damage due to the impartation of external vibrations thereto.

Figure 5:
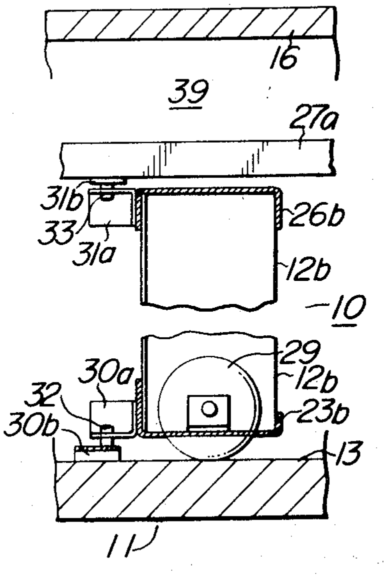
FIG. 5 is an enlarged vertical sectional view to show a mounting structure for a bay, especially a movable bay contained within the casing.

In FIG. 5 there is shown a practical mounting structure for mounting each of the movable bays **12*b* within the casing 11. The movable bay 12*b* is equipped at its bottom plate 23*b* with one or more wheels 29 for supporting the weight thereof and on the side faces of its upper plate 26*b* and bottom plate 23*b* with respective hinge members 30*a* and 31*a*. A hinge member 30*b* forming a hinge joint with the hinge member 30*a* and a hinge member 31*b* forming a hinge joint with the hinge member 31*a* are fixed to the floor 13 and the beam 27*a* or 27*b*, respectively, and the hinge members 30*a*, 30*b* and the hinge members 31*a*, 31*b* are connected to each other by respective hinge pins 32 and 33 so that the movable bay 12*b* can make a swinging movement over the floor 13 about the coaxial hinge pins 32 and 33**.

From the foregoing detailed description, the arrangements of the bays 12 contained within the casing 11 and the mounting structures for mounting the stationary bays **12*a* and the movable bays 12*b* to the casing 11 will be well understood. Referring again to FIG. 2, a first passage 34 for maintenance is defined between the side walls 14 of the casing 11 and the stationary bays 12*a* in the bay blocks 17 and 18, while a second passage 35 for maintenance is defined between the bay blocks 17 and 18, that is, between the opposite rows 20 of the movable bays 12*b***.

The first maintenance passage 34 has a minimum width which is sufficient to ensure an unobstructed maintenance work by a maintenance engineer and to permit free carriage of measuring instruments required for the maintenance work. Similarly, the second maintenance passage 35 must also have a width which is sufficient for the execution of maintenance work and the carriage of the necessary measuring instruments therethrough, but it is to be noted that the width of the second maintenance passage 35 must be such that any one of the movable bays **12*b* can freely make its swinging movement from its closed position to its full open position shown by chain lines. In the second maintenance passage 35 having such a width, the movable bays 12*b* which are located directly opposite to each other in the two bay blocks 17 and 18** cannot simultaneously be moved to their open position, but such a possibility hardly occurs in practical maintenance work and no inconvenience whatsoever would arise from the above arrangement.

The first maintenance passage 34 serves for the maintenance and inspection of the front side of the stationary bays **12*a*, or more practically, the front side of the electronic equipment and appliances mounted in the stationary bays 12*a*. The second maintenance passage 35 serves for the maintenance and inspection of the front side of the movable bays 12*b* in their closed position, that is, the front side of the electronic equipment and appliances mounted in the movable bays 12*b*. Furthermore, the second maintenance passage 35 serves for the maintenance and inspection of the rear side of the movable bays 12*b* in their full open position, that is, the rear side of the electronic equipment and appliances mounted in the movable bays 12*b*, and the rear side of the stationary bays 12*a*, that is, the rear side of the electronic equipment and appliances mounted in the stationary bays 12*a***.

It will be understood that the transportable telephone exchange apparatus 10 comprising such a large number of the bays 12 contained in a highly dense relation within the container casing 11 of small volume has a very large line capacity in spite of its small size. It will be further understood that maintenance work at the electronic equipment and appliances mounted in the bays 12 can be performed unobstructedly by virtue of the provision of the maintenance passages arranged in the manner described above.

Figure 3:
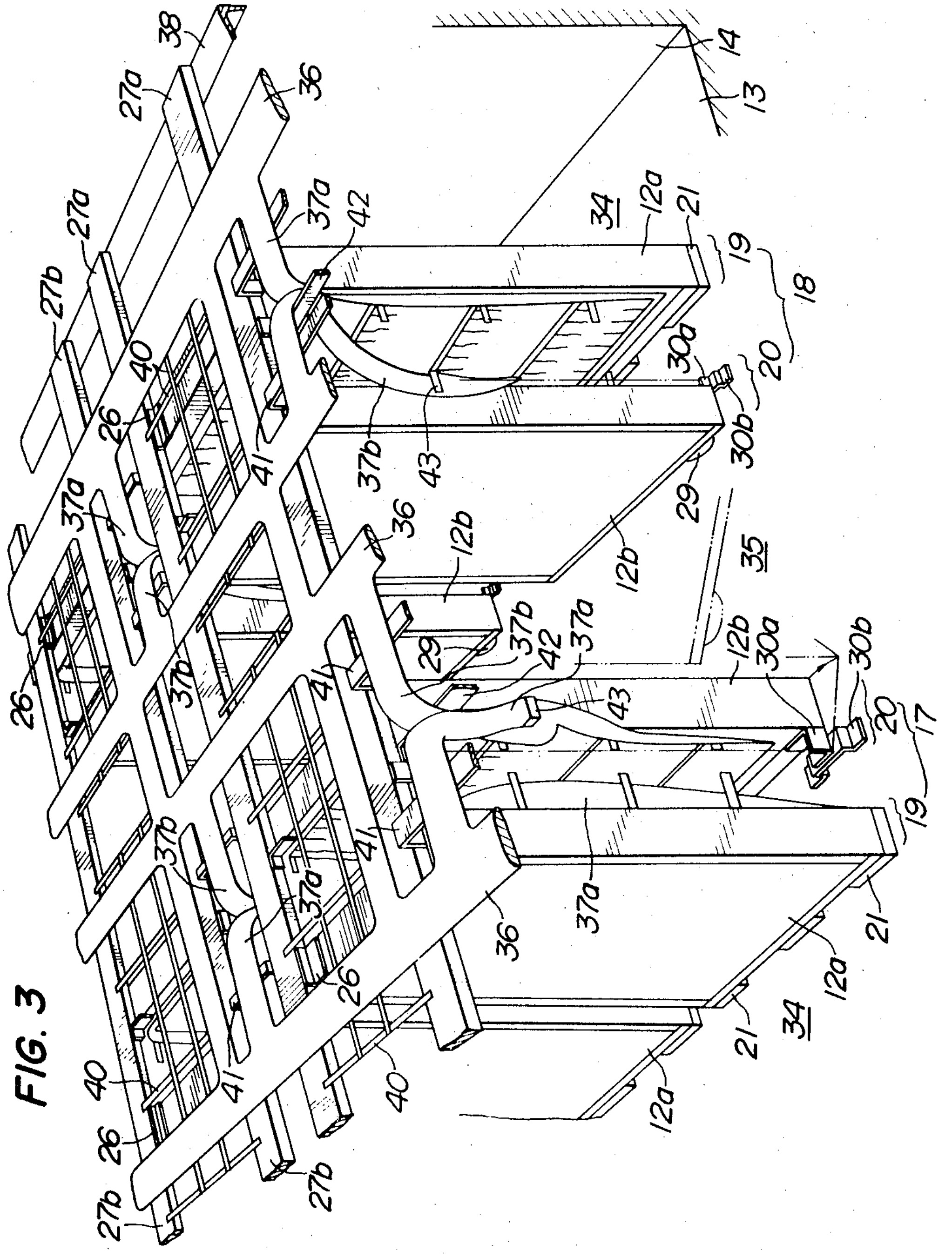
FIG. 3 is an enlarged perspective view of the interior of the casing to show part of the bays, cables and structural members contained within the casing.

FIG. 3 shows the state of installation of a main composite cable 36 for electrically interconnecting the bays 12 contained within the casing 11 as well as for supplying electric power to these bays 12 and of subsidiary composite cables 37*a* and 37*b* branched off from the main composite cable 36 to be directly connected with the electronic equipment and appliances mounted in the bays 12. It will be apparent from FIG. 3 that all the beams 27*a* and 27*b* are secured at opposite ends to angle bars 38 fixed to the side walls 14 of the casing 11, and the spacing between the beams 27*a* as well as between the beams 27*b* is substantially equal to the length of the bay 12, while the spacing between the adjoining beams 27*a* and 27*b* is substantially equal to the spacing between the adjacent bays 12 in each row.

The main composite cable 36 and part of the subsidiary composite cables 37*a* and 37*b* branched off from the main composite cable 36 are arranged to run through a dead space 39 (FIGS. 4 and 5) which is inevitably formed between the ceiling 16 of the casing 11 and the transverse beams 27*a* and 27*b*, and the weight of the main composite cable 36 is substantially entirely supported by the beams 27*a* and 27*b*. That portion of the main composite cable 36 extending over the pair of the beams 27*a* and the pair of the beams 27*b* whose spacing is substantially equal to the length of the individual bays 12 is unavoidably subject to a slight deflection. In order to avoid the main composite cable 36 from drooping at such a portion, a first auxiliary cable rack 40 is spanned between the pair of beams 27*a* and between the pair of beams 27*b* to support the main composite cable 36 at the point of its maximum deflection. However, these first auxiliary cable racks 40 are unnecessary at places where the main composite cable 36 comprises a small number of unit cables and hence its deflection due to its own weight is quite negligible. Therefore, the first auxiliary cable racks 40 may selectively be disposed at suitable places depending on the main cable arrangement.

Second auxiliary cable racks 41 are spanned between the adjacent beams 27*a* and 27*b* whose spacing is equal to the spacing between the adjacent bays 12 in each row and are spaced at a distance which is substantially equal to the spacing between the rows 19 and 20 of the bays 12. Each subsidiary composite cable 37*a* which is branched off from the main composite cable 36 for connection with the corresponding stationary bay 12*a* is passed over one of the second auxiliary cable racks 41 and is then bent gently downward to be guided into the space between the opposite bays 12. Between the second auxiliary cable racks 41, there is a first cable supporting member 42 which is fixed at opposite ends to the adjoining beams 27*a* and 27*b*. Each subsidiary composite cable 37*b* which is branched off from the main composite cable 36 for connection with the corresponding movable bay 12*b* is passed over the other cable rack 41 to be bound to the first cable supporting member 42 and is then bent gently downward to be guided into the space between the opposite bays 12. A second cable supporting member 43 is disposed on one side of each movable bay 12*b* so that the drooping subsidiary composite cable 37*b* can be bound thereto. The subsidiary composite cables 37*a* and 37*b* guided into the space between the opposite bays 12 are further finely divided into branches and are then bent at substantially right angles to be led to the stationary bay 12*a* and the movable 12*b*, respectively, with their individual cables terminating in the electronic equipment and appliances mounted in the bays 12.

It will be understood that, according to the present invention, the main composite cable 36 and part of the subsidiary composite cables 37*a* and 37*b* are laid in the dead space 39 inevitably formed between the ceiling 16 of the main casing 11 and the transverse beams 27*a* and 27*b*, and the main composite cable 36 is supported by the beams 27*a* and 27*b* which primarily act to prevent a turnover of the bays 12, thereby eliminating the need for provision of any special support means for the main composite cable 36. The above arrangement is very effective to reduce the overall height of the casing 11 and to correspondingly reduce the weight of the casing 11. The arrangement in which the subsidiary composite cables 37*a* and 37*b* are guided into the space between the opposite bays 12 in each bay block 17, 18 is also effective in that the width of the first and second maintenance passages 34 and 35 can fully be utilized and there is no hindrance to the free carriage of measuring instruments and to the free passage of a maintenance engineer. Furthermore, because of the fact that the subsidiary composite cable 37*b* to be connected with the movable bay 12*b* is bound to at least two cable supporting members 42 and 43, such a difficulty can completely be avoided in which the swinging movement of the movable bay 12*b* from its closed position to its open position would cause an unusual and irregular twist of the subsidiary composite cable 37*b* and would result in a cutoff of the cable 37*b*.

Figure 6:
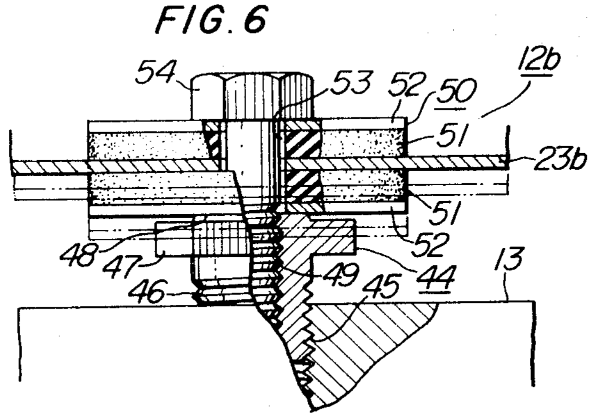
FIG. 6 is an enlarged vertical sectional view to show how a vibration absorbing means mounted on the floor of the casing is associated with the bottom portion of the movable bay to resiliently support the latter.

FIG. 6 shows how the bottom plate 23*b* of the movable bay 12*b* is connected with a plurality of vibration absorbing means 44 mounted on the floor 13 of the casing 11. Although only one is shown in the drawing, a plurality of tapped holes 45 are provided in the floor 13. The tapped holes 45 may be provided at any position on the locus drawn by the movable bay 12*b* during its swinging movement, but it is most preferable that they are disposed at a position directly beneath the movable bay 12*b* when it is in its closed position.

Each vibration absorbing means 44 comprises an externally threaded shank portion 46 for threaded engagement with any one of the tapped holes 45, a flange portion 47 with which a tool such as a wrench can be engaged for turning the vibration absorbing means 44, an abutment face portion 48 projecting upwardly from the flange portion 47, and a central axial threaded hole 49.

A plurality of resilient seats 50 having a cushioning function are provided on the bottom plate 23*b* of the movable bay 12*b* in such a relation that each seat 50 is coaxially aligned in the closed position of the movable bay 12*b* with the vibration absorbing means 44 which is in threaded engagement with the tapped hole 45. The resilient seat 50 comprises resilient members 51 cemented or otherwise fixed to the upper and lower faces of the bottom plate 23*b*, and washers 52 of sheet steel cemented or otherwise fixed to the outer faces of the resilient members 51. Further, a hole 53 extends through the washers 52, the resilient members 51 and the bottom plate 23*b* in coaxial relation with the tapped hole 45 receiving therein the shank portion 46 of the vibration absorbing means 44.

When now the movable bay 12*b* is kept in its closed position and a tool is engaged with the flange portion 47 to turn the vibration absorbing means 44 for causing an upward movement thereof, the abutment face portion 48 engages the lower washer 52 and urges the movable bay 12*b* gradually upward. FIG. 6 illustrates the state in which the movable bay 12*b* is thus urged upward from the lower position shown by the chain lines to the upper position shown by the solid lines. In such an upper position of the movable bay 12*b*, the wheels 29 mounted to the bottom plate 23*b* shown in FIGS. 3 and 5 are disengaged from the floor 13 and the hinge member 30*a* mounted on the lower side face of the movable bay 12*b* shown in FIG. 5 is lifted to make a slight engagement with the hinge pin 32 which is integral with the floor 13. A bolt 54 which serves as a fixing means is inserted from within the movable bay 12*b* into the hole 53 and screwed into the threaded hole 49 of the vibration absorbing means 44 so as to bodily fix the movable bay 12*b* to the vibration absorbing means 44.

According to such a mounting structure for resiliently mounting the movable bay 12*b* on the floor 13, the resilient members 51 in the resilient seat 50 absorb external vibrations developed during the transportation of the mobile telephone exchange apparatus 10 to its destination, and thus a lot of electronic equipment and appliances mounted in the movable bay 12*b* can be protected against undesirable vibrations. Further, because of the fact that the movable bay *b* is carried in a state in which it is slightly lifted from the normal mounted position relative to the casing 11, the subsidiary composite cable 37*b* is not subjected to any unusual deformation and may be carried in a state in which it has already been connected with the movable bay 12*b* in the factory.

After the transportable telephone exchange apparatus 10 has been carried to its destination and set up on the preformed concrete foundation, the bolts 54 are disengaged from the vibration absorbing means 44, and the vibration absorbing means 44 are then turned to be lowered until the wheels 29 of the movable 12*b* engage the floor 13 so that the movable bay 12*b* can be swingably supported again by the hinge means and the wheels 29 carry the entire weight of the movable bay 12*b*.

Although an embodiment of the present invention has been described in the specification and illustrated in the accompanying drawings by way of example, it will be understood that the present invention is in no way limited to such a specific embodiment which is merely given so that those skilled in the art may completely understand the method of practicing the present invention in its practical applications. Therefore, many changes and modifications may be made therein to best suit the special conditions encountered in the practical applications without departing from the scope of the appended claims specifying the present invention.

What is claimed is:

1. A transportable telephone exchange apparatus comprising:

a generally boxlike container casing having a ceiling, a floor and walls;

a number of bays contained within said casing and forming at least two bay blocks, each of which includes a plurality of bays arranged in two rows in a back-to-back relationship with each other, said bays included in one of said rows being immovable relative to said casing while said bays included in the other of said rows being swingable about an axis relative to said casing, the arrangement of said bay blocks within said casing being such that said swingable bays in the different rows are disposed in a face-to-face relationship with each other;

a first passage for maintenance defined between the opposite side walls of said casing and said immovable bays;

a second passage for maintenance defined between said bay blocks, said second passage having a sufficient width to permit unobstructed swinging movement of said swingable bays; and beams provided between the top of the bays and the ceiling of said casing across the rows of the bays, said bays being supported at the top portions thereof, some immovably and others rotatably by said beams, said beams supporting main composite cables to be connected to said bays, and each of said swingable bays being provided with an entrance at the corner thereof on the side adjacent to said axis of swinging movement for introducing said cables, wherein vibration absorbing means are disposed on the floor of said casing within the locus drawn by each swingable bay during its swinging movement, said means being operative to slightly lift said swingable bay and resiliently fix said bay in its lifted state, said floor of said casing being provided with a plurality of tapped holes for fixedly supporting said vibration absorbing means, said vibration absorbing means having a threaded shank portion for threaded engagement with any one of said tapped holes, and a flange portion for displacing said vibration absorbing means shank portion with respect to said tapped holes, and wherein each swingable bay is provided with a plurality of cushioning resilient members on the upper and lower surfaces of which are disposed washers for engaging a bolt, which is arranged for threaded engagement with the interior portion of said threaded shank portion, whereby said bay may be secured to said floor of said casing in a substantially vibration free manner.

* * * * *